Aug. 25, 1931.  E. WILDHABER  1,820,415
GEAR CUTTING TOOL
Filed March 11, 1927
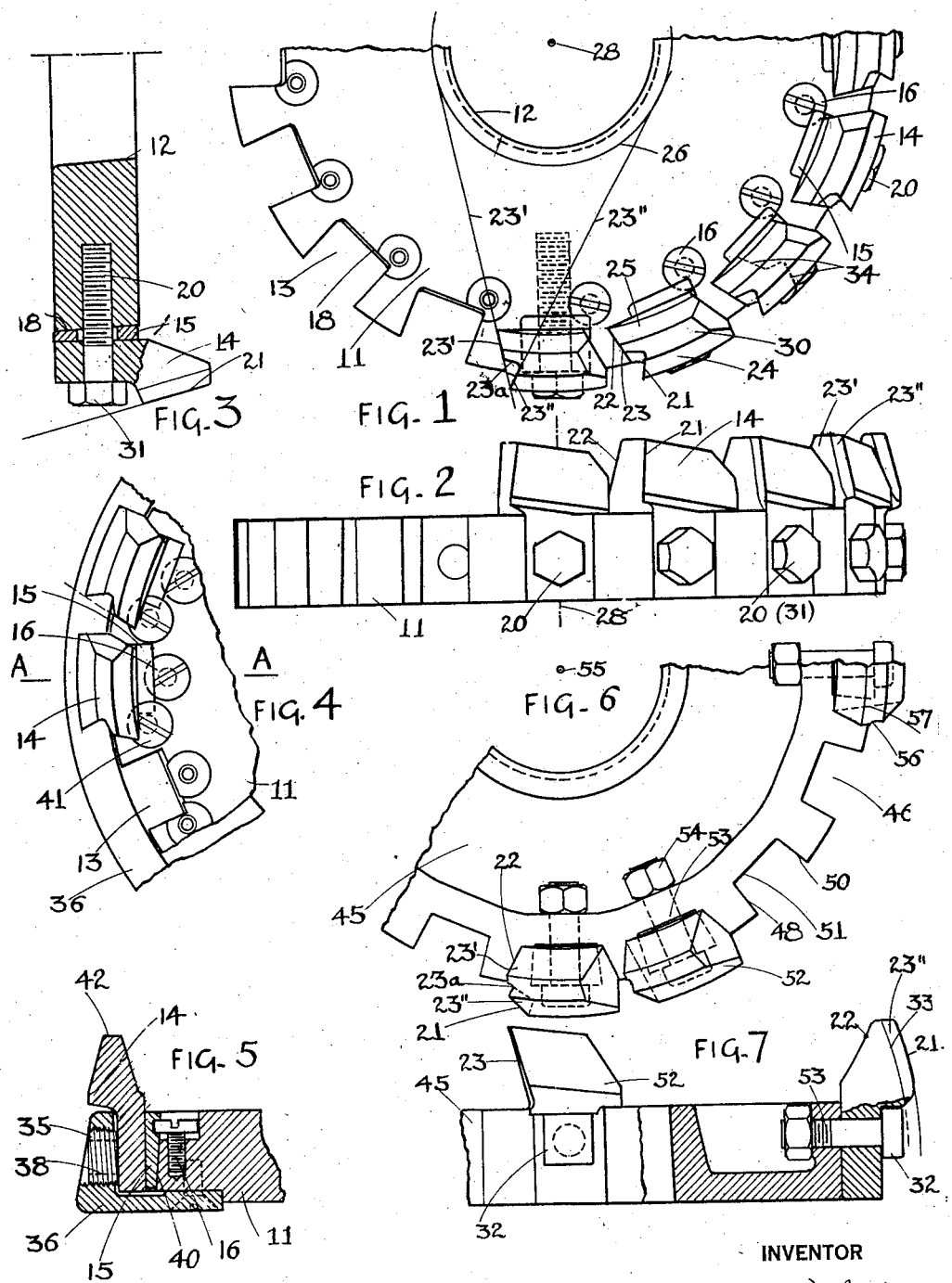
INVENTOR
Ernest Wildhaber Patented Aug. 25, 1931

1,820,415

UNITED STATES PATENT OFFICE

ERNEST WILDHABER, OF BROOKLYN, NEW YORK

GEAR CUTTING TOOL

Application filed March 11, 1927. Serial No. 174,517.

The present invention relates to cutting tools for cutting the teeth of gears and more particularly to rotary cutting tools which are provided with a plurality of cutting teeth, said cutting teeth projecting from the plane of the cutting tool, substantially in the direction of the axis of said tool. Tools of this type are used for producing teeth of lengthwise curvature in gears of any kind, and especially for cutting spiral bevel gears and hypoid gears.

The main object of the present invention is to provide a practical gear cutting tool of the above said character, which permits of an increased gear production and a finer finish of the cut tooth surfaces.

Hitherto used face mill type gear cutters contain cutting teeth, which are provided with a single side cutting edge only. In other words, a cutting tooth acts only on one tooth side of a blank at a time. Moreover a rake angle is provided on the cutting edges. The rake angle has been found very useful in cutting most materials, especially steel. It effects a keener cutting edge, namely a cutting angle which is smaller than 90°, and causes a smoother cut while reducing the cutting effort.

The most commonly used face mill type gear cutter contains two systems or groups of cutting teeth, alternate cutting teeth being alike. One group contains only outside cutting edges, that is cutting edges which are outwardly disposed; and the other group contains only inside cutting edges, that is cutting edges which are inwardly disposed.

Another known face mill type gear cutter contains cutting teeth, each of which may be provided with an outside cutting edge as well as with an inside cutting edge, but does not contain a rake angle. In other words the cutting face of its cutting teeth lies in a plane which contains the axis of the cutter.

According to the present invention each cutting tooth or blade is provided with an outside cutting edge as well as with an inside cutting edge, while the suitable rake angles are maintained. The cutting face of a cutting tooth is then no more a single plane, but a composite surface, composed of a plurality of elementary surfaces. Preferably the area of the cutting face adjacent a cutting edge is kept a plane, and the whole face is then composed of two planes and of an intermediate connecting surface.

A substantial part of the present invention resides in creating such an embodiment, that the novel cutting tool can be resharpened with ease and accuracy. This is effected by suitably disposing the cutting faces, and if inserted blades are used, as preferable in medium and large sized tools, by changing the shape of the blades or of the cutter body or blade holder.

This will be fully described hereafter.

In the drawings,

Fig. 1 is a partial plan view of a gear cutting tool according to the present invention.

Fig. 2 is a front elevational view corresponding to Fig. 1.

Fig. 3 is a sectional view of the same tool, the sectional plane containing the axis of the tool.

Fig. 4 is a partial plan view of a slightly modified tool, constructed according to the present invention.

Fig. 5 is a section along lines A—A of Fig. 4, the sectional plane A—A containing the axis of the tool.

Fig. 6 is a partial plan view of a gear cutting tool, illustrating another embodiment of the present invention.

Fig. 7 is a front elevational view, partly an axial section, of the tool shown in Fig. 6.

In the Figures 1-3, 11 denotes a cutter body of disk shape, having a slightly tapered bore 12 in the center, and a series of slots 13 on its periphery. These slots are to receive inserted blades or cutting teeth 14, which may be adjusted radially on the cutter body by means of wedges 15. Adjusting is done by turning set screw 16, which raises or lowers wedge 15 in known manner, and simultaneously moves it radially on account of the tapered bottom 18 of the slots 13.

The blades are tightly held in the slots by means of screw bolts 20. Each blade 14 contains an outside cutting edge 21 and an inside cutting edge 22, formed by the composite cutting face 23 on the relieved surfaces 24 and 25. In the embodiment shown face 23 is composed of a plane 23' (or part of such plane) which is parallel to the axis 28 of the cutting tool and offset from said axis in such manner as to effect a keen inside cutting edge 22, of an intermediate surface 23a, and a plane 23'' parallel to axis 28 and offset therefrom so as to effect a keen outside cutting edge 21. The planes 23' and 23'' are tangent to a cylindrical surface or surfaces 26, which is concentric with cutter axis 28.

The relieved side surfaces 24 and 25 are joined by an also relieved top surface 30. Relief is provided in such manner that the surfaces back of the cutting edges keep clear of the blank, that is to say do not touch it during the cutting operation.

In the face mill type cutter especially referred to and illustrated in the drawings relief is preferably effected along helices, which are coaxial with cutter axis 28. In other words, the relieved surfaces 24, 25, 30 are preferably parts of helicoidal surfaces.

The cutter is resharpened by grinding back the cutting face 23. It is noted that outside cutting edge 21 may come up to, but never protrudes over plane 23' which forms the inside cutting edge. The latter may therefore be resharpened without any difficulty, by traversing a grinding wheel of any desirable diameter along 23'. Cutting edge 21 remains hereby unaffected, since it does not protrude over plane 23'.

The outside cutting edge 21 may be resharpened by traversing a grinding wheel along cutting edge 21, and thus covering a zone of plane 23'', and preferably at the same time also intermediate surface 23a. In doing this, one is not confined to a very small grinding wheel only, if the blade is so formed (see Fig. 3 and Fig. 7) that the outside cutting edge protrudes over the lower portion of the blade, and that the screw heads 31 and 32 stand back of the line of which the outside cutting edge 21 forms a part. In the embodiment shown in Fig. 7 even a grinding wheel of extremely large diameter might be used without interfering with any part of the cutter. The screw head 32 namely stands back even from line 33, which constitutes the inside limit of the desired zone of plane 23''.

A cutting face, such as will appear after repeated resharpening is indicated in dotted lines at 34 in Fig. 1.

In practice, all the slots (13) are filled up with blades.

The cutter body is rigidly secured to a cutter spindle by any suitable known means not further indicated.

To allow for inaccuracies as may occur in mounting and in sharpening the blades, adjustment of the individual blades may be provided. Fig. 1 to Fig. 3 show the known blade adjustment, as hitherto used. If adjustment of the individual blades is provided, it is however preferable to use two adjustments instead of only one. An embodiment with two adjustments is illustrated in the Figures 4 and 5.

Blade 14 is held in slot 13 by means of a short screw 35 of a ring 36, which is rigidly secured to the main cutter body 11. Screw 35 contains a square hole, indicated in dotted lines 38 in Fig. 5, for turning the screw. Screw 35 presses blade 14 against wedge 15, whose position is controlled by set screw 16. The head of set screw 16 projects into a recess of wedge 15. To change the radial position of blade 14, that is to move blade 14 radially in slot 13, screw 35 is first loosened, and set screw 16 is then turned. If the set screw 16 is moved downward (see Fig. 5), the wedge 15 is moved downwardly and also outwardly by reason of taper 40, and thus moves the blade outwardly. Upward motion of set screw 16 will adjust blade 14 inwardly.

The radial adjustment described corresponds to the adjustment as hitherto used. If no further adjustment is provided, it will generally not be possible to true up both the inside cutting edge and the outside cutting edge, but only one of the two. The other cutting edge may then run slightly out of true.

In order to true up both outside and inside cutting edges, an additional adjustment is provided, preferably in the direction of the cutter axis. This is effected by a screw 41 (Fig. 4) acting directly on blade 14, that is projecting with its head into a recess of the blade 14, in the same manner as set screw 16 projects into a recess of wedge 15. In Fig. 4 screw 41 is seen to project also into wedge 15. Wedge 15 is so cut away that it does not touch screw 41. By operating screw 41, blade 14 is moved in the direction of the axis of the screw, that is in a direction parallel to the cutter axis.

When moving blade 14 upwardly, both the inside cutting edge and the outside cutting edge project over their former position. In other words moving the blade upwardly has substantially the same effect on the side cutting edges, as if the outside cutting edge were moved out and the inside cutting edge were moved in. By combining upward or downward adjustment of the blade with the aforesaid radial adjustment, any desirable position of the outside cutting edge and of the inside cutting edge may be arrived at, and both side cutting edges may therefore be trued up completely.

The adjustment of the blade in the direction of the cutter axis affects also to some extent the position of the top edge 42 (Fig. 5). Inasmuch as however the here considered cutter is largely a finishing tool, and inasmuch as it is customary to rough out the tooth spaces of the gear blanks to a depth slightly in excess of the cut of the finishing tool, the top edge 42 does practically no cutting work, and its accurate position is unimportant.

Preferably one blade, the master blade, is left unadjusted, and the other blades are adjusted to that blade.

The embodiment illustrated in Fig. 6 and Fig. 7 provides no individual adjustment of the cutter blades. If so desired, the cutter may be adjusted as a whole by any suitable known means, not further shown. To be a complete success, such a cutter must be made very accurately, resharpened very accurately and set carefully.

The circular cutter body 45, part of which is shown only, is provided on its periphery with equally spaced tapered slots or recesses 46. The slots are formed by two plane side surfaces 48, 50 angularly disposed to each other, and a bottom surface 51. The slots are filled with blades 52 which are held in the slots by screws 53, whose nuts 54 are disposed inside of the blades 52. With this arrangement of screw and nut, head 32 can be kept particularly small, so that it is an easy matter to keep it inside of line 33, which terminates the lane of the plane 23″ adjacent the outside cutting edge 21, (Fig. 7).

The blades are preferably so dimensioned, that they do not touch the bottom 51 of the slots 46, but are pressed against the two tapered sides 48, 50.

In the embodiment illustrated in Fig. 6 and 7 the cutting face 23 is again a composite surface, consisting of plane 23′ adjacent inside cutting edge 22, of an intermediate surface 23a, and of plane 23″ adjacent outside cutting edge 21. The planes 23′ and 23″ are however not parallel to the cutter axis 55 but tipped forward, so that the point 56 of a blade is advanced with respect to the base 57 of the cutting face. In this arrangement the outside cutting edge 21 is preferably disposed substantially in the plane 23′, which is adjacent the inside cutting edge 22. Plane 23″ adjacent outside cutting edge 21 recedes from plane 23′ in such manner as to effect a keen cutting edge 21.

I have shown curved cutting edges 21, 22 (Fig. 7) to indicate that the invention is applicable likewise to straight and to curved cutting edges.

The present invention has been illustrated particularly with reference to face mill type gear cutters intended for cutting the same tooth space with all blades, as used on machines in which the blank is periodically indexed, namely after a tooth space has been completely finished. It can however also be applied without change in the principles to face mill type gear cutters intended for cutting subsequent tooth spaces with subsequent blades, as used on machines where the blank is continuously indexed. The cutting process is then frequently called hobbing, and the cutter might be termed a face hob. The application to such hob type cutters can be kept so close along the lines described, that separate illustration is deemed unnecessary.

In general it is understood that such changes and modifications may be made in my invention, as fall within the limits of the appended claims.

What I claim is:

1. A gear cutting tool of face mill type containing a cutter body, relieved cutting teeth projecting from said cutter body adjacent its periphery, an outside and an inside cutting edge being formed on each of said cutting teeth by a composite cutting face, said cutting face being composed of two different surfaces adjacent the two cutting edges respectively and of an intermediate connecting surface which intersects one of said two surfaces in an edge.

2. A gear cutting tool of face mill type containing a cutter body, relieved cutting teeth projecting from said cutter body adjacent its periphery, an outside and an inside cutting edge being formed on each of said cutting teeth by a composite cutting face, said cutting face being composed of two different planes extending adjacent the respective cutting edges and of an intermediate connecting surface which intersects one of said two planes in an edge.

3. A gear cutting tool of face mill type containing a cutter body, relieved cutting teeth projecting from said cutter body adjacent its periphery, an outside and an inside cutting edge being formed on each of said cutting teeth by a composite cutting face, said cutting face containing two surfaces disposed at an acute angle to each other and extending respectively adjacent the two cutting edges along lines parallel to the axis of the cutting tool.

4. Gear cutting tool of face mill type, containing a cutter body, relieved cutting teeth projecting from said cutter body, cutting edges formed on said cutting teeth by composite cutting faces, said cutting faces being composed of two planes disposed at an acute angle to each other and extending parallel to the axis of said tool, and of an intermediate surface, each cutting tooth being provided with an outside and with an inside cutting edge formed by said two planes respectively.

5. In a gear cutting tool of the face mill type, a cutter body, slots provided in said cutter body adjacent its periphery, a plurality of blades inserted in said slots, each of said blades containing an inside cutting edge as well as an outside cutting edge and a portion suited to be inserted in said slots, the outside surface of said inserted portion standing back from the adjacent portion of said outside cutting edge and forming a partial recess for means for securing said blade to its slot.

6. A gear cutting tool of face mill type, containing a cutter body, slots provided on the outside circumference of said cutter body, blades inserted in said slots, each of said blades containing an outside cutting edge as well as an inside cutting edge, head screws and nuts for securing said blades to said cutter body, said screws extending through the blades and having their heads disposed on the outside of the blades and their nuts on the inside of the blades.

7. A gear cutting tool of face mill type, containing a cutter body, a plurality of blades inserted in slots of said cutter body, outside and inside cutting edges being provided on the same blades, means for adjusting said blades in a manner to move both cutting edges of a blade in the same direction, further means for adjusting a blade in a manner equivalent to simultaneously moving one of said cutting edges inwardly and the other of said cutting edges outwardly, and means for tightening said blades.

8. A gear cutting tool of face mill type, containing a cutter body, a plurality of blades inserted in slots of said cutter body, each of said blades containing an outside cutting edge as well as an inside cutting edge, means for adjusting said blades in the plane of the cutter body to move both cutting edges of a blade in the same direction, means for adjusting said blades in the direction of the cutter axis in a manner equivalent to moving one cutting edge of a blade inwardly and the other cutting edge outwardly, and means for tightening the blades.

9. A gear cutting tool of face mill type, containing a cutter body, a plurality of relieved cutting teeth projecting from said cutter body, composite cutting faces forming inside cutting edges and outside cutting edges on the same cutting teeth, the portion of a cutting face adjacent the inside cutting edge extending along one plane, and the portion of said cutting face adjacent the outside cutting edge extending along another plane, the portion adjacent the outside cutting edge standing wholly back of the plane of the other portion.

10. A gear cutting tool of face mill type, containing a cutter body, a plurality of relieved cutting teeth projecting from said cutter body, composite cutting faces forming inside cutting edges and outside cutting edges on the same cutting teeth, the portion of a cutting face adjacent the inside cutting edge extending along one surface, and the portion of said cutting face adjacent the outside cutting edge extending along another surface, one of said portions standing wholly back of the surface of the other.

ERNEST WILDHABER.